United States Patent [19]

Ferrari

[11] Patent Number: 4,678,632

[45] Date of Patent: Jul. 7, 1987

[54] NUCLEAR FUEL ASSEMBLY GRID WITH PREDETERMINED GRAIN ORIENTATION

[75] Inventor: Harry M. Ferrari, Edgewood Boro, Pa.

[73] Assignee: Westinghouse Electric Corp., Pittsburgh, Pa.

[21] Appl. No.: 786,986

[22] Filed: Oct. 15, 1985

Related U.S. Application Data

[63] Continuation-in-part of Ser. No. 741,425, Jun. 5, 1985.

[51] Int. Cl.$^4$ .............................................. G21C 3/34
[52] U.S. Cl. .................................... 376/462; 376/438; 376/441; 376/442; 376/445; 29/18; 29/400 N
[58] Field of Search ............... 376/462, 438, 441, 442, 376/445, 457, 903, 906; 29/18, 400 N

[56] References Cited

U.S. PATENT DOCUMENTS

| | | | |
|---|---|---|---|
| 3,262,182 | 7/1966 | Duret | 376/903 |
| 4,474,730 | 10/1984 | Hellman | 376/462 |

Primary Examiner—Donald P. Walsh
Attorney, Agent, or Firm—D. M. Satina

[57] ABSTRACT

Zirconium alloy or Zircaloy grid straps in a fuel assembly grid have predetermined texture (or grain orientation) to offset stress relaxation which occurs upon irradiation of the grid. Particularly, by providing "f-factor" values of the material greater in generally orthogonal, longitudinal directions of the straps than in the strap height direction, the grid strap material will undergo irradiation shrinkage in the longitudinal directions which will serve to offset stress relaxation and maintain sufficient spring force on the fuel rods extending through the cells formed by the grid straps.

9 Claims, 6 Drawing Figures

ZIRCONIUM CRYSTAL STRUCTURE

BASAL POLE

ZIRCONIUM CRYSTAL STRUCTURE

NUCLEAR FUEL ASSEMBLY GRID WITH PREDETERMINED GRAIN ORIENTATION

CROSS REFERENCE TO RELATED APPLICATION

This application is a continuation-in-part of copending U.S. patent application Ser. No. 741,425, filed June 5, 1985.

BACKGROUND OF THE INVENTION

1. Field of the Invention

The present invention relates generally to fuel assemblies for nuclear reactors and, more particularly, is concerned with a grid for a fuel assembly made from zirconium alloy metal material having a predetermined grain orientation which reacts to irradiation so as to offset the effects of irradiation-induced stress relaxation of the grid components which hold the fuel rods of the assembly.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above and below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Conventional designs of grids include a multiplicity of interleaved straps having an egg-crate configuration designed to form cells which individually accept the fuel rods and control rod guide thimbles. The cells of each grid which accept and support the fuel rods at a given axial location therealong typically use relatively resilient springs and relatively rigid protrustions (called dimples) formed into the metal of the interleaved straps. The springs and dimples of each grid cell frictionally engage or contact the respective fuel rod extending through the cell. Additionally, outer straps are attached together and peripherally enclose the grid straps to impart strength and rigidity to the grid.

In view that the operation of the reactor core involves irradiation of the fuel rods and that the grids are irradiated along with the fuel rods they support, the grids inherently degrade somewhat over time as a result. In particular, notwithstanding improvements in grid construction, such as illustrated and described in U.S. Pat. No. 4,474,730 to Hellman et al and assigned to the assignee of the present invention, over the life of the fuel assembly the metal material of the interleaved straps forming the grid, and thereby the springs and dimples formed therein, is subject to stress relaxation due to irradiation. This effect is especially marked in the case of grids fabricated from zirconium alloy metal material. The occurrence of stress relaxation of the springs, dimples and interleaved straps of the grid causes a general loosening of the grid's hold on the fuel rods, introducing gaps between the fuel rods and the grid and decreasing the supporting forces imposed by the grid on the fuel rods. Such loosening results in excessive fretting of the fuel rods and lengthwise distortion or bowing thereof over time.

Consequently, a need exists for a technique to compensate for irradiation-induced stress relaxation of the metal material of grids, especially those fabricated from zirconium alloy metal material. The technique must be one which reduces or eliminates the deleterious effects of stress relaxation on the fuel rods being held by the grids.

SUMMARY OF THE INVENTION

The present invention provides a fuel assembly grid fabricated from zirconium alloy metal material having a predetermined grain orientation designed to satisfy the aforementioned needs. Underlying the present invention is the recognition that the design of a zirconium alloy metal grid can be optimized by taking advantage of the fact that zirconium alloys grow differently in different directions depending on the texture (or grain orientation) of the material. Thus, the objective of the present invention is to design and fabricate a zirconium alloy metal-based grid which has the proper texture (grain orientation) and spring and dimple design and orientation so that the grid cell size growth during irradiation is reduced and is preferably approximately zero or decreases slightly. Thus, the opposing springs and dimples in a cell move closer together over time so as to offset the normally-occurring stress relaxation of the springs and creepdown of the fuel rod tube clad. In such manner, an adequately high positive spring force will be maintained against the fuel rods throughout the life of the fuel assembly. By maintaining a sufficiently high spring force, it is possible to prevent low spring forces and gaps from forming between the grid and fuel rods which otherwise would result in fretting and fuel rod bowing problems.

Accordingly, the present invention is directed to an improvement set forth in a fuel assembly support grid including interleaved straps defining a multiplicity of cells. Each cell is adapted to receive a fuel rod therethrough in a direction generally along an axis of the cell and to exert a predetermined spring force on the fuel rod in a direction along a cross-section of the cell which is sufficient for holding the fuel rod in a predetermined position. The straps are fabricated from material which upon irradiation grows differently in different directions depending on the texture of the material. The key factor characterizing texture in such material, for example zirconium alloy material, is called an orientation parameter "f". The orientation parameter "f", hereinafter called the "f-factor" is the fraction of crystals aligned with their [0001] axis (or basal pole) parallel to a given direction, assuming that the material is represented as a single crystal. Thus, in a rolled plate, for example, the sum of the "f-factor" in the three principal plate directions must add up to one. Normally, upon irradiation of the material, directions having values approaching 0.33 show no change in dimensions. However, those that have values approaching zero show the maximum growth whereas those that have values approaching one show the maximum shrinkage.

The improvement comprises the provision of the material of the grid straps with an "f-factor" value greater in the direction along the cross-section of the grid cell than in the direction along the axis of the grid cell, whereby upon irradiation of the grid any relaxation thereof will be offset by shrinkage of the grid strap material in the direction along the cross-section of each of the grid cells and thereby maintain the predetermined spring force on each of the fuel rods.

More particularly, the "f-factor" value of the material in the direction along the cross-section of the cell is preferably within the range of 0.4 to 0.5, whereas the "f-factor" value of the material in the direction along the axis of the cell is preferably within the range of 0.2 to 0.3.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
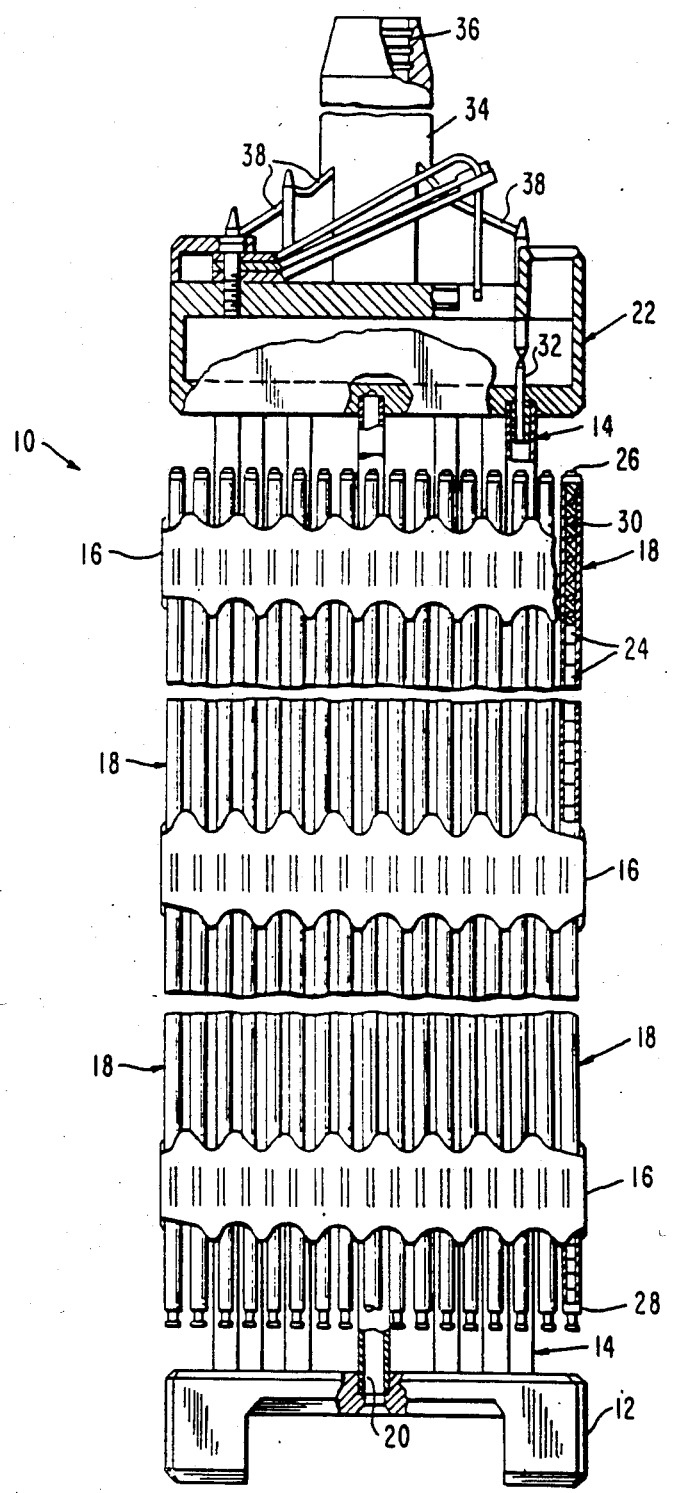
FIG. 1 is an elevational view, partly in section, of a nuclear fuel assembly employing fuel rod support grids constructed in accordance with the principles of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16, contructed in accordance with the principles of the present invention to be described shortly, axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Fuel Rod Support Grid

Figure 2:
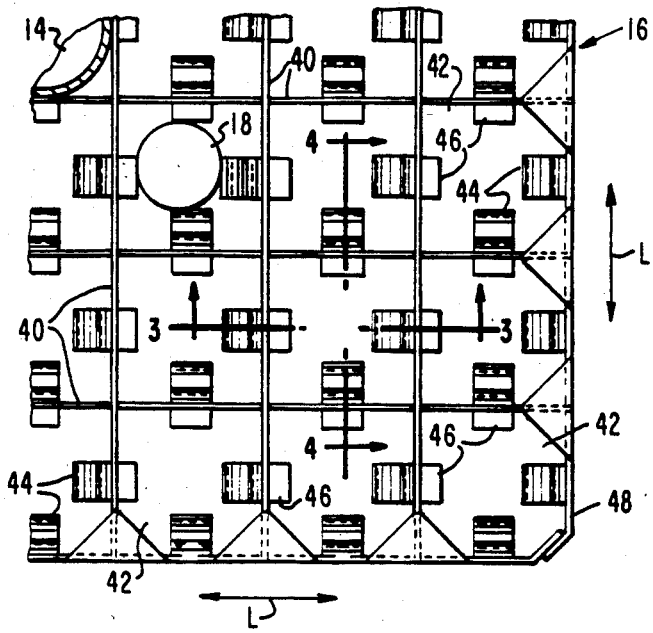
FIG. 2 is an enlarged fragmentary top plan view of one of the fuel rod support grids of the fuel assembly of FIG. 1, showing the springs and dimples disposed within the grid cells with one fuel rod being inserted through a cell.
Figure 4:
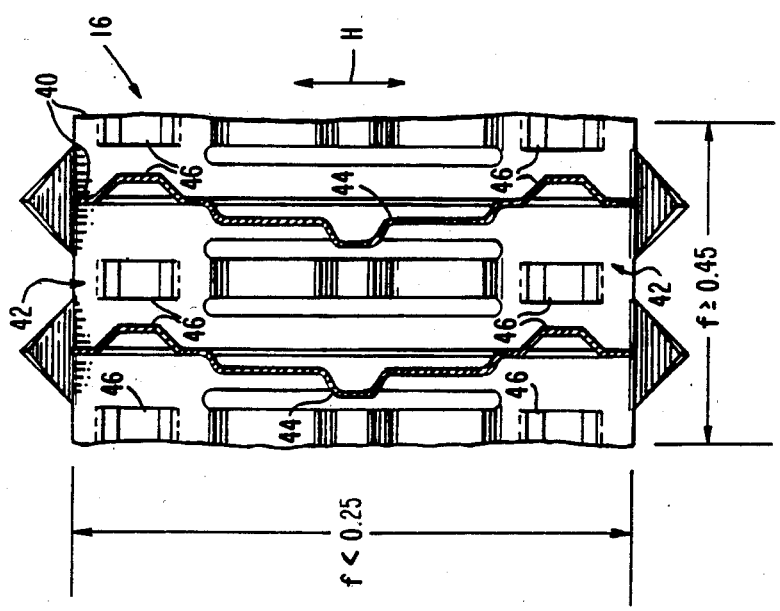
FIG. 4 is another enlarged fragmentary sectional view similar to that of FIG. 3, but taken along line 4—4 of FIG. 2 which is displaced ninety degrees from line 3—3 of FIG. 2.
Figure 3:
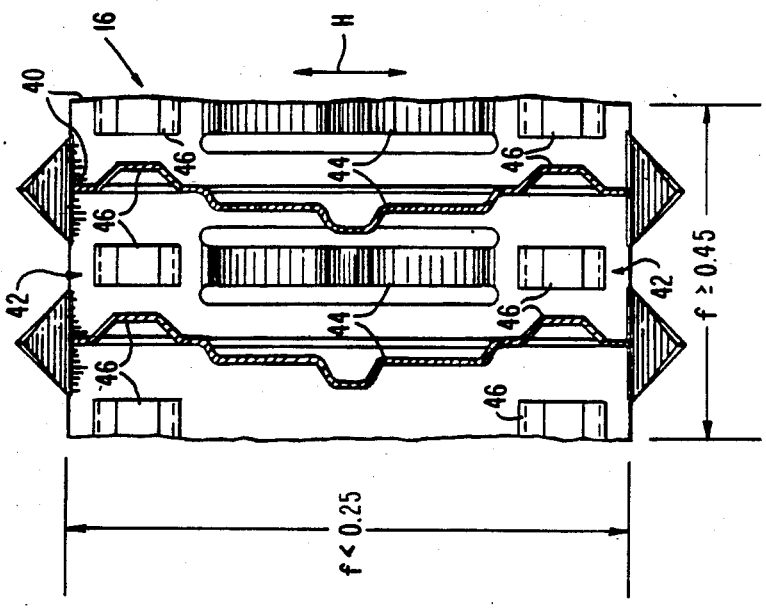
FIG. 3 is an enlarged fragmentary sectional view taken along line 3—3 of FIG. 2.

For precisely maintaining the spacing between the fuel rods 18 in the reactor core and preventing both lateral and longitudinal movement thereof, the grids 16 are conventionally designed to impose spring forces on the fuel rods 18 directed from around the circumference of the individual rod radially inwardly toward the longitudinal axis of the rod. Referring now to FIGS. 2 to 4, it is seen that each of the grids 16 includes a multiplicity of interleaved inner straps 40 having an egg-crate configuration designed to form cells, indicated as 42, a majority of which individually accept one fuel rod 18 (for purposes of clarity only one cell 42 is shown in FIG. 2 with a fuel rod 18 disposed through it) and a minority of which accept one control rod guide thimble 14.

The cells 42 of each grid 16 which accept and support the fuel rods 18 at a given axial location therealong typically use relatively resilient springs 44 and relatively rigid protrusions or dimples 46 formed into the metal of the interleaved inner straps 40 to generate the spring forces need to hold the fuel rods therein. Also, the inner straps 40 are generally flexible such that they bow somewhat when the fuel rods 18 are disposed through the grid cells 42. In the illustrated embodiment, there are two springs 44 on two adjacent sides of each cell 42 containing a fuel rod 18 and two dimples 46 on each of two adjacent sides of the cell facing each spring. The springs 44 and dimples 46 of each grid cell 42 frictionally engage or contact the respective fuel rod 18 extending through the cell. Additionally, outer straps 48 are attached together and peripherally enclose the grid inner straps 40 to impart strength and rigidity to the grid 16. Thus, the actual spring force imposed on a given fuel rod 18 results from interaction with one another of the resilient springs 44, rigid dimples 46 and flexible interleaved straps 40 comprising the cell 42 which receives the fuel rod.

Predetermined Texture of Zirconium Alloy Grid Structure

In accordance with the principles of the present invention, the above-described conventional structure of the fuel rod support grid 16, which is ordinarily fabricated from zirconium alloy metal material, is improved and optimized by taking advantage of the fact that zirconium alloys grow differently in different directions depending on the texture (or grain orientation) of the material. Ziracoly-4, a zirconium alloy commonly used in the construction of grids, has the following composition:

Sn 1.20 to 1.70 weight/per cent
Fe 0.18 to 0.24
Cr 0.07 to 0.13
Ni 0.007 maximum Note: Sum of Fe and Cr must be 0.28 percent minimum, and oxygen is 1000–1450 ppm.

Heretofore, no attention was given to texture of the metal material when constructing the components of the grid 16. In the present invention, it has now been recognized that by using zirconium alloy strip material, after being worked by a suitable conventional fabrication process, such as rolling with appropriate intermediate and final heat treatments and beta quenching, to obtain an appropriate predetermined texture, and by designing the springs 44 and dimples 46 appropriately, as will be explained hereinafter, the support grid 16 can be improved so as to maintain a relatively high spring force throughout the life of the fuel assembly 10.

Zirconium Crystal Structure and Material Texture

Before turning to a description of how design of the components of the support grid 16 with the texture of the grid material in mind leads to improvement in the performance of the grid, it would be useful to briefly summarize that portion of conventional knowledge regarding the crystal structures of metals in general and of zirconium in specific which provides background for understanding the present invention. To begin, as mentioned in *Mechanical Metallurgy* by G. E. Dieter, Jr., (1961), page 82, "x-ray diffraction analysis shows that the atoms in a metal crystal are arranged in a regular, repeated three-dimensional pattern. The atom arrangement of metals is most simply portrayed by a crystal lattice in which the atoms are visualized as hard balls located at particular locations in a geometrical arrangement." Many of the common metals have either a body-centered cubic or face-centered cubic crystal structure. The body-centered cubic crystal structure has an atom at each corner and another atom at the body center of the cube. Typical metals which have this crystal structure are iron, chromium, and molybdenum. The face-centered cubic crystal structure is identical to the body-centered cubic crystal structure and in addition thereto has an atom at the center of each cube face. Aluminum, copper, gold, lead, silver and nickel are common face-centered cubic metals.

Figure 5:
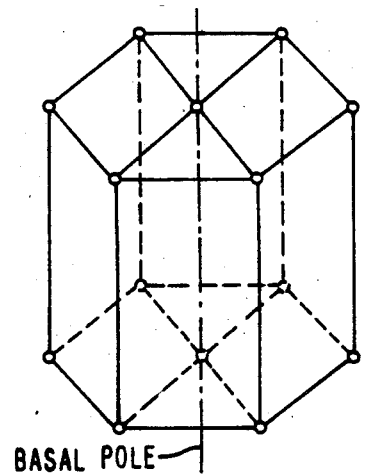
FIG. 5 is a geometrical representation of the crystal structure of hexagonal close-packed metal material, such as zirconium, illustrating its basal pole.

A third somewhat less common metallic structure is the hexagonal close-packed crystal structure, as seen in FIG. 5. Zirconium, titanium and magnesium have this crystal structure at room temperature. The crystal structure of hexagonal close-packed materials like zirconium are not as symmetrical as that of body-centered and face-centered crystal structures. This means that when these materials are deformed during normal metal working processes, such as sheet or tube fabrication, the deformation process can only occur in a limited number of directions on an atomic scale because of different atom densities in different directions. The net result is that the deformed material is anisotropic, i.e., it has different texture (grain orientation) and different mechanical properties in different directions. Thus, materials which have different textures (grain orientations) and different properties in different directions such as zirconium and its alloys are known as anisotropic materials.

The nature of the preferred orientation (texture) which arises from cold working and heat treatment can be varied by changing the fabrication schedule. Variables which are important are rolling direction, amount of reduction per pass, temperature of heat treatment between passes, final heat treatment, cooling rate from heat treatment temperature, cross rolling, etc. A discussion of the relationship of fabrication processes and textures is contained in "The Physical Metallurgy of Zirconium" by D. L. Douglas in *Atomic Energy Review* (1963), Vol. 1, No. 4, pages 128–133.

Figure 6:
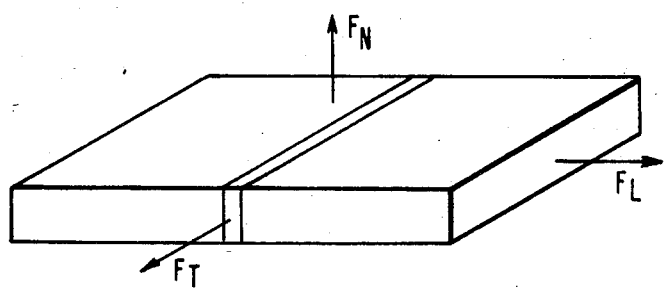
FIG. 6 is a geometrical representation of a rolled plate showing the "f-factor" associated with each of the three principal plate directions.

As mentioned earlier, the key factor characterizing texture in zirconium alloy materials is called an "f-factor". The f-factor, or orientation parameter, is the fraction of crystals aligned with their [0001] axis (or basal pole seen in FIG. 5) parallel to a given direction, assuming that the material is represented as a single crystal. For example, in a rolled plate such as seen in FIG. 6, $F_N$, $F_T$ and $F_L$ represent the fraction of [0001] crystal axes aligned in three principal plate directions: normal (N), transverse (T) and rolling (L) directions. Values of f of 0 and 1.0 indicate perfect alignment of the [0001] crystal directions perpendicular or parallel, respectively, to the direction of interest, or given direction. The sum of f in the three principal directions must be unity. Normally, upon irradiation of the zirconium material, directions having values approaching 0.33 show no change in dimensions whereas those that have values approaching zero show the maximum growth and those that have values approaching one show the maximum shrinkage. For a more detailed discussion of the orientation parameter, herein referred to as the "f-factor", attention is directed to a November 1965 report designated WAPD-TM-472 by J. J. Kearnes entitled "Thermal Expansion And Preferred Orientation In Zircaloy".

Application of Texture to Support Grid

Referring to FIGS. 3 and 4, the improvement of the present invention is to provide fully recrystallized zirconium alloy or Zircaloy grid straps 40 in the grid 16 which have "f-factor" values of 0.45 and higher in generally orthogonal, longitudinal directions L (FIG. 2), values less than 0.25 in the strap height direction H (FIGS. 3 and 4), and values of approximately 0.6 in the thickness direction. The generally orthogonal, longitudinal directions L of the grid straps 40 extend along a cross-section through the cells 42 of the grid 16, whereas the height direction of the straps 40 extend along the axes of the cells 42 along which the fuel rods 18 are received through the cells. In view of the objective of the present invention, the value of "f" in each longitudinal direction L is most important, the value of "f" in the height direction H is only moderately important and the value of "f" in the strap thickness direction is relatively unimportant. The values preferably should be fairly high in the longitudinal direction (0.4–0.5) and relatively low (0.2–0.3) in the height direction consistent with strap fabrication difficulty. It is noted that the more highly textured (grain oriented) the product, the more difficult it is to fabricate so that a reasonable compromise must be made.

If a value of f=0.4 in the longitudinal direction L assumed, the grid cell size can be expected to decrease approximately 0.06% due to irradiation shrinkage which is approximately 0.4 mil in a typical PWR (pressurized water reactor) fuel assembly. A value of f=0.5 would result in a decrease of approximately 0.12% which is approximately 0.8 mil. This is adequate in most cases without any consideration to spring or dimple design or texture in the height direction H.

For a typical BWR application assuming a fast neutron (>1 Mev) fluence of $6 \times 10^{21}$ nvt, the growth in the lateral direction would typically be for a texture of f=0.3 about 0.04% which is sufficiently small so as to be negligible. In the height direction assuming a typical texture of f=0.12, the cold-worked spring growth would be greater than the recrystallization annealed wall because of the cold working and the fact that it is longer. The net result is approximately 0.1% delta growth of the spring which means that the spring will project into the cell slightly more. The net result is that contact is maintained between the grid and the fuel rod which prevent fretting.

However, if additional irradiation growth of the springs 44 and dimples 46 is desired to further reduce the distance between the springs and dimples (the distance across each grid cell 42), a low value of "f" in the height direction must be combined with the proper axial orientation of the springs and dimples. Specifically, the springs 44 and dimples 46 when oriented axially in the direction of the strap height H, as seen in FIGS. 3 and 4, will have projected lengths which are longer than the height of the openings of the strap 40 at the opposite ends of which the springs and dimples are attached. The material of the springs 44 and dimples 46 will thus grow in length in the strap height direction more than the remaining material of the strap 40 will grow in height in the strap height direction. Since the springs 44 and dimples 46 are held at opposite ends where they are attached to the strap 40, and since the springs and dimples grow more under irradiation, they must move (project) farther into the grid cell 42 and radially against the fuel rod 18 extending through the grid cell which thereby increases the spring force between the fuel rod 18 and the grid 16.

Assuming a value of f=0.16, in the height direction, the irradiation growth in length of the spring 44 and dimple 46 is calculated to be 1.25% versus 1% for the strap 40 in the height direction and the net result is that the spring and dimple will project farther against the fuel rod 18 by about one mil.

It is thought that the present invention and many of its attendant advantages will be understood from the foregoing description and it will be apparent that various changes may be made in the form, construction and arrangment thereof without departing from the spirit and scope of the invention or sacrificing all of its material advantages, the form hereinbefore described being merely a preferred or exemplary embodiment thereof.

I claim:

1. In a fuel assembly support grid including interleaved straps fabricated from fully recrystallized material which upon irradiation grows differently in different directions depending on the texture of the material and defining a multiplicity of cells, each cell adapted to receive a fuel rod therethrough in a direction generally along an axis of said cell and to exert a predetermined spring force on said fuel rod in a direction along a cross-section of said cell which is sufficient for holding the said fuel rod in a predetermined position, the improvement which comprises:

said fully recrystallized material of said grid straps having respective predetermined "f-factor" values in said direction along said cross-section of said grid cell and in said direction along said axis of said grid cell such that upon irradiation of said grid any stess relaxation thereof in said direction along said axis of each of said grid cells will be substantially offset by shrinkage of said grid strap material in said direction along said cross-section of each of said grid cells and thereby maintain said predetermined spring force on each of said fuel rods.

2. The grid as recited in claim 1, wherein said "f-factor" value of said material in said direction along with cross-section of said cell is preferably within the range of 0.4 to 0.5.

3. The grid as recited in claim 1, wherein said "f-factor" value of said material in said direction along said axis of said cell is preferably within the range of 0.2 to 0.3.

4. In a fuel assembly support grid including interleaved straps fabricated from fully recrystallized zirconium alloy metal material and extending in generally orthogonal, longitudinal directions so as to define a multiplicity of cells, each cell adapted to receive a fuel rod therethrough in a direction generally along the height of said straps, and a plurality of spring-like elements defined on said straps in each cell and extending in said direction along the strap height and into said each cell for exerting a predetermined spring force on said fuel rod which is sufficient for holding the said fuel rod in a predetermined position, the improvement which comprises:

said fully recrystallized material of said grid straps having respective predetermined "f-factor" values in said longitudinal directions of said straps and in said height direction of said straps such that upon irradiation of said grid any stress relaxation thereof will be offset by shrinkage of said grid strap material in said longitudinal directions of said straps and elongation of said material of said grid straps and said spring-like elements in said height direction and thereby maintain said predetermined spring force on each of said fuel rods.

5. The grid as recited in claim 4, wherein said length of said each spring-like element is related to the height of said each strap such that said elongation of said material of said strap and said spring-like element results in a greater increase in said length of said element than in said height of said strap whereby said element extends farther into said cell and its spring force exerted on said fuel rod therein is correspondingly increased.

6. The grid as recited in claim 4, wherein said "f-factor" value of said material in said longitudinal directions of said straps is preferably within the range of 0.4 to 0.5.

7. The grid as recited in claim 6, wherein said "f-factor" value of said material in said height direction of said straps is preferably within the range of 0.2 to 0.3.

8. The grid as recited in claim 4, wherein said "f-factor" value of said material in said longitudinal directions of said straps is preferably 0.45 or greater.

9. In a fuel assembly support grid, the combination comprising:
(a) a plurality of interleaved straps fabricated from fully recrystallized zirconium alloy metal material and extending in generally orthogonal, longitudinal directions so as to define a multiplicity of cells, each cell adapted to receive a fuel rod therethrough in a direction generally along the height of said straps; and
(b) a plurality of spring-like elements defined on said straps in each cell and extending in said direction along the strap height and into said each cell for exerting a predetermined spring force on said fuel rod which is sufficient for holding said fuel rod in a predetermined position;
(c) said fully recrystallized material of said grid straps having respective predetermined "f-factor" values in said longitudinal directions of said straps and in said height direction of said straps such that upon irradiation of said grid any stress relaxation thereof will be offset by shrinkage of said grid strap material in said longitudinal directions of said straps and elongations of said material of said grid straps and said spring-like elements in said height direction and thereby maintain said predetermined spring force on each of said fuel rods.

* * * * *